(12) United States Patent
Hao et al.

(10) Patent No.: US 12,474,723 B2
(45) Date of Patent: Nov. 18, 2025

(54) METHOD AND APPARATUS FOR ADJUSTING HARDNESS OF OUTFLOW WATER FROM WATER SOFTENING DEVICE AND ELECTRONIC DEVICE

(71) Applicants: FOSHAN MIDEA CHUNGHO WATER PURIFICATION EQUIPMENT CO., LTD., Foshan (CN); MIDEA GROUP CO., LTD., Foshan (CN)

(72) Inventors: Zhipeng Hao, Foshan (CN); Chenghuan Hu, Foshan (CN); Pu Qing, Foshan (CN); Bo Zhang, Foshan (CN); Ziming Gong, Foshan (CN); Rensheng Huang, Foshan (CN); Yuedong Zheng, Foshan (CN); Yumin Liao, Foshan (CN)

(73) Assignees: FOSHAN MIDEA CHUNGHO WATER PURIFICATION EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 18/563,909

(22) PCT Filed: Apr. 11, 2023

(86) PCT No.: PCT/CN2023/087669
§ 371 (c)(1),
(2) Date: Nov. 23, 2023

(87) PCT Pub. No.: WO2023/231586
PCT Pub. Date: Dec. 7, 2023

(65) Prior Publication Data
US 2025/0103070 A1  Mar. 27, 2025

(30) Foreign Application Priority Data
May 30, 2022  (CN) .......................... 202210605780.7

(51) Int. Cl.
*G05D 11/13* (2006.01)
*B01F 23/40* (2022.01)
(Continued)

(52) U.S. Cl.
CPC .......... *G05D 11/139* (2013.01); *B01F 23/405* (2022.01); *B01F 35/2206* (2022.01);
(Continued)

(58) Field of Classification Search
CPC ..... G05D 11/139; G05D 11/135; C02F 1/008; C02F 1/42; C02F 2209/055;
(Continued)

(56) References Cited

U.S. PATENT DOCUMENTS 7,448,102 B2 * 11/2008 Milligan ................ D06B 23/28
                                                137/101.25
9,223,322 B2 * 12/2015 Dopslaff ................ G05D 21/02
(Continued)

FOREIGN PATENT DOCUMENTS

CN          201305512 Y      9/2009
CN          104528878 A      4/2015
(Continued)

OTHER PUBLICATIONS

EESR received in EP Application No. 23805439.9; mailed Apr. 11, 2024.
(Continued)

*Primary Examiner* — William M McCalister
(74) *Attorney, Agent, or Firm* — K&L Gates LLP

(57) ABSTRACT

The present disclosure relates a water softening devices, and provides a method for adjusting hardness of outflow water
(Continued)

```
┌─────────────────────────────────────────────────────────┐
│ Determining, in response to a hardness adjustment       │  ─S1
│ request for the outflow water, target hardness of       │
│ outflow water corresponding to the hardness adjustment  │
│ request for the outflow water                           │
└─────────────────────────────────────────────────────────┘
                            │
                            ▼
┌─────────────────────────────────────────────────────────┐
│ Determining a water mixing ratio of soft water to raw   │  ─S2
│ water based on the target hardness of outflow water     │
└─────────────────────────────────────────────────────────┘
                            │
                            ▼
┌─────────────────────────────────────────────────────────┐
│ Adjusting an opening degree of a water mixing unit of   │  ─S3
│ the water softening device based on the water mixing    │
│ ratio                                                   │
└─────────────────────────────────────────────────────────┘
``` from a water softening device, including: determining, in response to a hardness adjustment request for the outflow water, target hardness of outflow water corresponding to the hardness adjustment request for the outflow water; determining a water mixing ratio of soft water to raw water based on the target hardness of outflow water; and adjusting an opening degree of a water mixing unit of the water softening device based on the water mixing ratio, where the water mixing unit is configured to control the mixing of raw water and soft water in the water softening device.

16 Claims, 2 Drawing Sheets

(51) Int. Cl.
*B01F 35/22* (2022.01)
*B01F 101/00* (2022.01)
*C02F 1/00* (2023.01)
*C02F 1/42* (2023.01)

(52) U.S. Cl.
CPC .......... *B01F 35/2209* (2022.01); *C02F 1/008* (2013.01); *C02F 1/42* (2013.01); *G05D 11/135* (2013.01); *B01F 2101/305* (2022.01); *C02F 2001/425* (2013.01); *C02F 2209/003* (2013.01); *C02F 2209/005* (2013.01); *C02F 2209/055* (2013.01); *C02F 2301/043* (2013.01)

(58) Field of Classification Search
CPC .......... C02F 2209/003; C02F 2209/005; C02F 2001/425; C02F 2301/043; B01F 35/2206; B01F 35/2209; B01F 23/405; B01F 2101/305
See application file for complete search history.

(56) References Cited

U.S. PATENT DOCUMENTS

| | | | | |
|---|---|---|---|---|
| 11,631,596 B2* | 4/2023 | Shimizu | ................ | G05D 21/02 700/282 |
| 11,987,490 B1* | 5/2024 | Moynihan | ................ | B67D 7/36 |
| 2004/0221889 A1* | 11/2004 | Dreyer | ................ | G05D 11/139 137/88 |
| 2005/0103717 A1* | 5/2005 | Jha | ................ | B01D 61/48 210/243 |
| 2005/0263457 A1* | 12/2005 | Wilkins | ................ | C02F 1/283 210/748.11 |
| 2006/0243647 A1* | 11/2006 | Mitsis | ................ | C02F 1/441 210/259 |
| 2007/0215531 A1* | 9/2007 | Wawrla | ................ | F16K 11/074 210/101 |
| 2008/0290009 A1* | 11/2008 | Koch | ................ | B01J 49/75 210/88 |
| 2009/0134080 A1* | 5/2009 | Fabig | ................ | B01D 61/12 210/181 |
| 2010/0051519 A1* | 3/2010 | Maier-Witt | ................ | C02F 1/008 210/89 |
| 2010/0301882 A1* | 12/2010 | Socknick | ................ | B01J 49/85 324/694 |
| 2011/0132818 A1 | 6/2011 | Dopslaff et al. | | |
| 2019/0339725 A1* | 11/2019 | Ding | ................ | G05D 7/0664 |
| 2022/0410139 A1* | 12/2022 | Averbeck | ................ | C02F 1/008 |

FOREIGN PATENT DOCUMENTS

| | | |
|---|---|---|
| CN | 109213215 A | 1/2019 |
| CN | 209161562 U | 7/2019 |
| CN | 111813162 A | 10/2020 |
| CN | 114935949 A | 8/2022 |
| DE | 102014101285 A1 | 8/2015 |
| JP | 3163892 U | 11/2010 |
| WO | 2011092184 A1 | 8/2011 |

OTHER PUBLICATIONS

Search Report Received in CN Application No. 202210605780.7; mailed Oct. 23, 2024.
ISR received in PCT/CN2023/087669; mailed Jul. 14, 2023.

* cited by examiner

METHOD AND APPARATUS FOR ADJUSTING HARDNESS OF OUTFLOW WATER FROM WATER SOFTENING DEVICE AND ELECTRONIC DEVICE

CROSS-REFERENCES TO RELATED APPLICATIONS

The present disclosure is a national phase application of International Application No. PCT/CN2023/087669, filed on Apr. 11, 2023, which claims priority to Chinese Patent Applications No. 202210605780.7, filed on May 30, 2022, which is hereby incorporated by reference in its entirety.

FIELD

The present disclosure relates to the field of water softening device, in particular to a method and an apparatus for adjusting hardness of outflow water from a water softening device and an electronic device.

BACKGROUND

A water softener is a household appliance converting hard tap water into soft water, which may improve the quality of household water. The principle of the water softener is to absorb excess calcium ions and magnesium ions in the tap water by exchanging calcium and magnesium ions in the tap water with an exchange resin containing sodium cations to soften the tap water.

However, hardness of the outflow water of the water softeners available on the market cannot be adjusted by customers which has been defined by a water softener manufacturer, which cannot meet requirements of a user for water having different hardness values.

SUMMARY

The present disclosure aims to address at least one of problems above. The present disclosure provides a method for adjusting hardness of outflow water from a water softening device, which may improve the convenience of adjusting the hardness of the outflow water from the water softener and meet requirements of a user for different hardness values of water.

The present disclosure further provides an apparatus for adjusting hardness of outflow water from a water softening device.

The present disclosure further provides an electronic device.

The present disclosure further provides a storage medium.

The present disclosure further provides a computer program product.

An embodiment of the present disclosure provides a method for adjusting hardness of outflow water from a water softening device, including:
  determining, in response to a hardness adjustment request for the outflow water, target hardness of outflow water corresponding to the hardness adjustment request for the outflow water;
  determining a water mixing ratio of soft water to raw water based on the target hardness of outflow water; and
  adjusting an opening degree of a water mixing unit of the water softening device based on the water mixing ratio, where the water mixing unit is configured to control the mixing of raw water and soft water in the water softening device.

In the method for adjusting the hardness of the outflow water from the water softening device according to the embodiment of the present disclosure, by determining the water mixing ratio of soft water to raw water based on the target hardness of outflow water adjusted by a request of a user, and determining the opening degree of the water mixing unit based on the water mixing ratio, the hardness of the outflow water from the water softening device can be conveniently and fast adjusted to meet requirements of the user for the outflow water having different hardness values.

According to an embodiment of the present disclosure, determining the target hardness of outflow water corresponding to the hardness adjustment request for the outflow
  determining the target hardness of outflow water based on a target hardness interval in the hardness adjustment request for the outflow water.

In the method for adjusting the hardness of the outflow water from the water softening device according to the embodiment of the present disclosure, the convenience for the user to adjust the hardness of the outflow water from the water softener is further improved by presetting a hardness interval value for the user to select and adjust.

According to an embodiment of the present disclosure, determining the target hardness of outflow water based on a target hardness interval in the hardness adjustment request for the outflow water includes:
  determining the target hardness of outflow water based on a target value in the target hardness interval in the hardness adjustment request for the outflow water,
  where the target value includes any one of the following:
  an intermediate value of the target hardness interval;
  a random value of the target hardness interval;
  a maximum value of the target hardness interval; and
  a minimum value of the target hardness interval.

In the method for adjusting the hardness of the outflow water from the water softening device according to the embodiment of the present disclosure, the target value can be obtained within the target hardness interval based on a hardness interval of outflow water that the user wants to adjust through different value obtaining modes to determine the target hardness of outflow water, which not only improves convenience of adjusting the hardness of the outflow water, but also meets requirements of the user for outflow water having different hardness values.

According to an embodiment of the present disclosure, determining the target hardness of outflow water corresponding to the hardness adjustment request for the outflow
  determining the target hardness of outflow water based on a target hardness configuration value in the hardness adjustment request for the outflow water.

In the method for adjusting the hardness of the outflow water from the water softening device according to the embodiment of the present disclosure, the user can configure a specific target hardness value of outflow water as needed, which can meet the requirements of the user for the outflow water, that is, to obtain higher-precision hardness of outflow water.

According to an embodiment of the present disclosure, after adjusting the opening degree of the water mixing unit of the water softening device based on the water mixing ratio, the method further includes:
  obtaining current hardness of outflow water from the water softening device; and determining an opening degree compensation value based on a difference between the current hardness of outflow water and the target hardness of outflow water, and adjusting the opening degree of the water mixing unit based on the opening degree compensation value.

In the method for adjusting the hardness of the outflow water from the water softening device according to the embodiment of the present disclosure, after the hardness of the outflow water from the water softener is adjusted according to the adjustment request from the user, the water mixing unit is finely adjusted based on a comparison between the actual hardness of outflow water and the target hardness of outflow water to further improve the accuracy of adjusting the hardness of the outflow water from the water softener.

According to an embodiment of the present disclosure, determining the water mixing ratio of soft water to raw water based on the target hardness of outflow water includes:

determining, in accordance with a determination that the target hardness of outflow water is within a preset adjustable threshold range, the water mixing ratio of soft water to raw water based on the target hardness of outflow water; or, indicating that, in accordance with a determination that the target hardness of outflow water is not within a preset adjustable threshold range, the hardness adjustment request for the outflow water is abnormal.

In the method for adjusting the hardness of the outflow water from the water softening device according to the embodiment of the present disclosure, it is determined, according to the hardness adjustment request for the outflow water, that whether the target hardness of outflow water input by the user is within the adjustable threshold range. If the target hardness of outflow water is within the adjustable threshold range, the hardness of the outflow water from the water softener is adjusted normally. If the target hardness of outflow water is not within the adjustable threshold range, the user needs to be prompted to re-enter the adjustment request, which improves the reliability of adjusting the hardness of the outflow water from the water softener.

According to an embodiment of the present disclosure, determining the water mixing ratio of soft water to raw water based on the target hardness of outflow water includes:

determining the water mixing ratio of soft water to raw water based on the target hardness of outflow water and a preset hardness of inflow water, and the method further includes:

reconfiguring, in response to a hardness adjustment request for the outflow water, the preset hardness of inflow water based on the inlet water hardness adjustment request.

In the method for adjusting the hardness of the outflow water from the water softening device according to the embodiment of the present disclosure, by determining the water mixing ratio of soft water to raw water based on the hardness of the outflow water and the hardness of inflow water, and providing a function of adjusting the hardness of inflow water, the user may adjust the hardness of inflow water based on the actual situation and can calculate a more accurate water mixing ratio, which further improves the accuracy of adjusting the hardness of the outflow water from the water softener.

According to an embodiment of the present disclosure, the water mixing unit adopts a continuously-adjustable regulating valve.

In the method for adjusting the hardness of the outflow water from the water softening device according to the embodiment of the present disclosure, the mixing ratio of soft water to raw water is controlled by the continuously-adjustable regulating valve, the precision of adjusting the hardness of the mixed water may be improved, which further improves the accuracy of adjusting the hardness of the outflow water from the water softener and improve user experience.

An embodiment of the present disclosure provides an apparatus for adjusting hardness of outflow water from a water softening device, including:

a response module for determining target hardness of outflow water corresponding to the hardness adjustment request for the outflow water in response to a hardness adjustment request for the outflow water;

a determining module for determining a water mixing ratio of soft water to raw water based on the target hardness of outflow water; and an adjusting module for adjusting an opening degree of a water mixing unit of a water softening device based on the water mixing ratio, where the water mixing unit is configured to control the mixing of raw water and soft water in the water softening device.

An embodiment of the present disclosure provides an electronic device, including a processor and a memory storing a computer program executable on the processor, the computer program, when executed by the processor, causes the electronic device to perform the method for adjusting hardness of outflow water from a water softening device mentioned above.

An embodiment of the present disclosure provides a non-transitory computer-readable storage medium storing a computer program, where the computer program, when executed by a processor, causes the processor to perform the method for adjusting hardness of outflow water from a water softening device mentioned above.

An embodiment of the present disclosure provides a computer product, including a computer program, where the computer program, when executed by a processor, causes the processor to perform the method for adjusting hardness of outflow water from a water softening device mentioned above.

One or more solutions in the embodiments of the present disclosure mentioned above have at least one of the following effects.

By calculating the water mixing ratio at an outflow water end of the water softening device based on the target hardness of outflow water and adjusting the opening degree of the water mixing unit based on the water mixing ratio, the hardness of the outflow water from the water softening device can be conveniently and fast adjusted to meet requirements of a user for the outflow water having different hardness values.

Embodiments of the present disclosure will be set forth in part in the description which follows and, in part, will be apparent from the description, or may be learned by practice of the presented disclosure.

BRIEF DESCRIPTION OF THE DRAWINGS

In order to clearly illustrate the solutions according to the present application or the related art, the accompanying drawings used in the description of the embodiments of the present application or the related art are briefly introduced below. It should be noted that the drawings in the following description are of only part embodiments of the present application.

DETAILED DESCRIPTION OF THE DISCLOSURE

Figure 1:
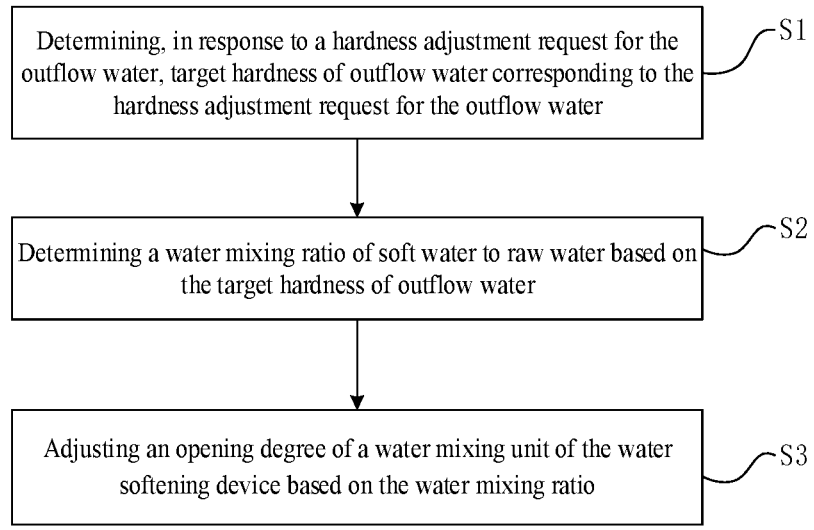
FIG. 1 is a schematic flow chart of a method for adjusting hardness of outflow water from a water softening device according to an embodiment of the present disclosure.

Embodiments of the present disclosure are further described in detail below with reference to the drawings and embodiments. The following embodiments are intended to illustrate the disclosure, but are not intended to limit the scope of the disclosure.

It should be noted that with the improvement of living conditions, people pay more and more attention to household water. More and more water softeners are on the market now. The water softeners can soften high-hardness water into soft water by replacing calcium and magnesium ions in the water with sodium ions, which has effects of prolonging a service life of a rear-end water-associated appliance, beautifying, caring skin and caring for clothes.

The hardness of water refers to a concentration of calcium ions and magnesium ions in the water, with a unit of hardness being ppm. 1 ppm represents 1 mg/L of calcium carbonate in the water.

Although the hardness of surface water of varies greatly in different regions, from tens of ppm to more than 900 ppm, the hardness of the outflow water softened by the currently available water softeners is usually 0 ppm or below 17.1 ppm or below 30 ppm. A traditional water softener generally has a fixed hardness of the outflow water, and a company selects a standard, such as below 17.1 ppm. Due to the fixed hardness of the outflow water, the traditional water softener cannot meet requirements for different hardness values for different people. For example, male and female, the elderly and children have different requirements for hardness. The traditional water softener cannot meet different requirements for the hardness of outflow water under different water use scenarios.

Two types of hardness of outflow water are from commercially available water softeners. One is that the hardness of outflow water cannot be adjusted at all and the water softeners can only be used according to the hardness value defined by the water softener manufacturer; another is that a control valve of the water softener is equipped with a mechanical water mixing units and the water mixing valve is closed under normal circumstances. When the hardness of the outflow water needs to be adjusted, the knob of the water mixing unit is turned on to manually adjust the opening degree of the water mixing unit, and adjust the hardness of the outflow water by adjusting the ratio of inflow water and soft water. When the hardness of outflow water is adjusted, the user tries to open the water mixing unit to test the hardness of outflow water and a desired hardness of outflow water can be obtained only after cycles of operation. Solution in the related art has the following defects: the use of professional testing tools and testing modes are required to test the hardness of the outflow water, which is inoperable by ordinary users; the hardness of the outflow water can be adjusted only if the water softener is disassembled since the mechanical water mixing unit is in the control valve of the water softener, which is difficult for users to operate; even if the required hardness of the outflow water is adjusted, the outflow water is still single and the hardness of the outflow water cannot be adjusted again conveniently and quickly, which neither meet the need of the user for different hardness value, nor meet the different requirements for water hardness in different water use scenarios.

Therefore, an urgent need for a fast and accurate fully automated solution that can automatically adjust the hardness of the outflow water from the water softeners in different installation areas is emerging.

Referring to FIG. 1, an embodiment of the present disclosure provides a method for adjusting hardness of outflow water from a water softening device, including the following.

S1: target hardness of outflow water corresponding to the hardness adjustment request for the outflow water is determined in response to a hardness adjustment request for the outflow water.

S2: a water mixing ratio of soft water to raw water is determined based on the target hardness of outflow water.

S3: an opening degree of a water mixing unit of a water softening device is adjusted based on the water mixing ratio, where the water mixing unit is configured to control the mixing of raw water and soft water in the water softening device.

In the embodiment of the present disclosure, when the user needs to adjust the hardness of the outflow water from the water softener, the user can trigger a hardness adjustment request for the outflow water. The user can initiate an adjustment request through a button or a touch screen on the water softener, or through a remote terminal with communication functions. After receiving the adjustment request for the hardness of outflow water, an adjustment device of the water softener can determine target hardness of outflow water corresponding to the adjustment request based on the request. For example, if the user triggers a button marked with 60-90 ppm, the adjustment device will determine the target hardness of outflow water to be 75 ppm (which is an intermediate value of the corresponding interval and can also be configured as other value methods as needed).

It should be noted that during the water mixing process of the water softener, one stream of water coming out of the resin tank and treated with softening resin is equivalent to softened water with hardness close to 0; another stream of water is raw water, and has hardness equal to the hardness of the inflow water; and the output water has an appropriate hardness after the two streams of water above are mixed. The hardness of inflow water can be pre-configured according to the actual situation such as the installation area. The water mixing ratio of soft water to raw water can be calculated after the target hardness of outflow water is determined. For example, the water mixing ratio of soft water to raw water can be calculated based on the pre-configured hardness of inflow water and target hardness of outflow water by using a law that the total hardness of the mixed water is equal to the total hardness of outflow water, that is, through the formula $L2 \times H1 = (L1+L2) \times H2$, where $L1$ is the amount of water treated by softening resin, $L2$ is the amount of mixed raw water, $H1$ is the hardness of the inflow water, and $H2$ is the hardness of the outflow water.

After the water mixing ratio that needs to be adjusted is calculated, the water mixing unit can be adjusted to an appropriate opening degree based on the water mixing ratio, and soft water with the hardness required by the user is obtained. It can be understood that a size of the opening degree of the water mixing unit determines the ratio of raw water to soft water. For example, if the opening degree of the water mixing unit is 60%, the mixing ratio of raw water to soft water is 6:4. The specific corresponding relationship between the opening degree of the water mixing unit and the water mixing ratio can be determined based on the actual situation.

In the method for adjusting the hardness of the outflow water from the water softening device according to the embodiment of the present disclosure, by determining the water mixing ratio of soft water to raw water based on the target hardness of outflow water adjusted by a request of a user, and determining the opening degree of the water mixing unit based on the water mixing ratio, the hardness of the outflow water from the water softening device can be conveniently and fast adjusted to meet requirements of the user for the outflow water having different hardness values.

In an embodiment of the present disclosure, the target hardness of outflow water corresponding to the hardness adjustment request for the outflow water may be determined based on a target hardness interval in the hardness adjustment request for the outflow water.

In an embodiment of the present disclosure, hardness intervals can be pre-configured for users to select. For example, a first soft water interval 0-17.1 ppm; a second soft water interval 60-90 ppm; and a third soft water interval 90-120 ppm, etc. The user may select the required soft water interval by triggering a button on the water softener or remote selection through an App. The adjustment device responds to the hardness adjustment request for the outflow water based on the operation of the user, and determines the target hardness of the outflow water based on the target hardness interval selected by the user.

In the method for adjusting the hardness of the outflow water from the water softening device according to the embodiment of the present disclosure, it is difficult for the elderly and children to input the specific required hardness value of outflow water since it has high operational requirements for users to use this function. However, it is relatively easy to select the corresponding interval according to the needs. Therefore, by the design of configuring hardness ranges for users to select, the difficulty of operation when users adjust the hardness of the outflow water is effectively reduced, which further improves the convenience for users to adjust the hardness of the outflow water from the water softener.

In an embodiment of the present disclosure, the target hardness of outflow water may be determined based on the target hardness interval in the hardness adjustment request for the outflow water by:
  determining the target hardness of outflow water based on a target value in the target hardness interval in the hardness adjustment request for the outflow water,
  where the target value includes any one of the following:
  an intermediate value of the target hardness interval;
  a random value of the target hardness interval;
  a maximum value of the target hardness interval; and
  a minimum value of the target hardness interval.

It should be noted that after the target hardness interval of soft water that the user wants to adjust is obtained, the target hardness of outflow water can be determined based on the target value of the target hardness interval. The target value may be any one of the following: the intermediate value of the target hardness interval, the random value of the target hardness interval, the maximum value of the target hardness interval, and the minimum value of the target hardness interval. For example, if the target hardness interval selected by the user is 60-90 ppm, the target value (which is configured as needed) of the 60-90 ppm may be taken as the target hardness of outflow water and be included in the calculation of the water mixing ratio. If moderate hardness of the outflow water in the interval needs to be obtained, the intermediate value, which is 75 ppm, of the target hardness interval may be selected as the target hardness of outflow water. If softer hardness of the outflow water in the interval needs to be obtained, the minimum value, which is 60 ppm, of the target hardness interval may be selected as the target hardness of outflow water. If harder hardness of the outflow water in the interval needs to be obtained, the maximum value, which is 90 ppm, of the target hardness interval may be selected as the target hardness of outflow water. If no special need is indicated, any value in the target hardness interval can be selected as the target hardness of the outflow water and the target hardness of the outflow water may be configured as actual needs.

In the method for adjusting the hardness of the outflow water from the water softening device according to the embodiment of the present disclosure, the target value can be obtained within the target hardness interval based on a hardness interval of outflow water that the user wants to adjust through different value obtaining modes to determine the target hardness of outflow water, which not only improves convenience of adjusting the hardness of the outflow water, but also meets requirements of the user for outflow water having different hardness values.

In an embodiment of the present disclosure, the target hardness of outflow water corresponding to the hardness adjustment request for the outflow water may be determined based on a target hardness configuration value in the hardness adjustment request for the outflow water.

In an embodiment of the present disclosure, the user may directly input a specific target hardness configuration value, such as 68 ppm as needed, and the adjustment device can directly calculate the water mixing ratio based on the target hardness configuration value in the adjustment request for the hardness of outflow water. It is understood that based on the scheme of adjusting the hardness of outflow water through the target hardness interval, the user can only roughly obtain a hardness of outflow water within the selected target hardness interval, but cannot obtain the precise hardness of outflow water. Therefore, it fails to meet the need of the user for more accurate hardness of the outflow water, and further fails to meet adjustment requirements for more accurate hardness of outflow water. In an embodiment of the present disclosure, the user can select the specific hardness value of outflow water that needs to be adjusted through the button or the touch screen on the water softener, or remote input through the App to obtain more accurate hardness of outflow water.

In the method for adjusting the hardness of the outflow water from the water softening device according to the embodiment of the present disclosure, the user can configure a specific target hardness value of outflow water as needed, which can meet requirements of the user for the outflow water, that is, to obtain higher-precision hardness of outflow water.

In an embodiment, after an opening degree of a water mixing unit of a water softening device based on the water mixing ratio is adjusted, the method may further include the following.

A current hardness of outflow water from the water softening device is obtained.

An opening degree compensation value is determined based on a difference between the current hardness of outflow water and the target hardness of outflow water, and the opening degree of the water mixing unit is adjusted based on the opening degree compensation value.

It should be noted that due to accuracy limitations of devices and other reasons, actual hardness of outflow water may deviate from the required hardness of outflow water input by the user. In order to solve this defect, in the embodiment of the present disclosure, the actual hardness of outflow water is detected and compared with the target hardness of outflow water to compensate and adjust the opening degree of the water mixing unit. The actual hardness can be detected by using a hardness sensor or a TDS sensor. For example, if the required hardness of outflow water input by the user is 50 ppm, and after responding to the adjustment request and adjusting the opening degree of the water mixing unit, the adjustment device detects that the current hardness of outflow water is 60 ppm, it needs to continue to adjust the opening degree of the water mixing unit for error compensation to make the actual hardness of outflow water as close as possible to 50 ppm required by the user. The specific compensation value for the opening degree is determined based on the difference between the current hardness of outflow water and the target hardness of outflow water, and the corresponding relationship between the pre-configured difference and the compensation value for the opening degree. For example, the corresponding compensation value for opening degree is 5% when the difference between current hardness of outflow water and the target hardness of outflow water is 10 ppm.

In the method for adjusting the hardness of the outflow water from the water softening device according to the embodiment of the present disclosure, after the hardness of the outflow water from the water softener is adjusted according to the adjustment request from the user, the water mixing unit is finely adjusted based on a comparison between the actual hardness of outflow water and the target hardness of outflow water to further improve the accuracy of adjusting the hardness of the outflow water from the water softener.

In an embodiment, the water mixing ratio of soft water to raw water may be determined based on the target hardness of outflow water by:
determining, in accordance with a determination that the target hardness of outflow water is within a preset adjustable threshold range, the water mixing ratio of soft water to raw water based on the target hardness of outflow water; or
indicating that, in accordance with a determination that the target hardness of outflow water is not within a preset adjustable threshold range, the hardness adjustment request for the outflow water is abnormal.

It should be noted that when the hardness of inflow water is fixed and the hardness of water treated with softening resin is fixed, adjustment of the final hardness of outflow water also has a range due to a limited range of the opening degree of the water mixing unit. Therefore, the subsequent water mixing ratio is calculated and the water mixing unit are controlled to adjust the hardness of the outflow water only if it is determined that the target hardness of the outflow water input by the user is within a preset adjustable threshold range. When it is determined that the target hardness of the outflow water input by the user is not within the preset adjustable threshold range, an abnormal prompt may be provided for the adjustment request for the hardness of outflow water. For example, abnormal prompt may be provided through voice or indicator lights, and the user can input the correct hardness value of outflow water.

In the method for adjusting the hardness of the outflow water from the water softening device according to the embodiment of the present disclosure, it is determined, according to the hardness adjustment request for the outflow water, that whether the target hardness of outflow water input by the user is within the adjustable threshold range. If the target hardness of outflow water is within the adjustable threshold range, the hardness of the outflow water from the water softener is adjusted normally. If the target hardness of outflow water is not within the adjustable threshold range, the user needs to be prompted to re-enter the adjustment request, which improves the reliability of adjusting the hardness of the outflow water from the water softener.

In an embodiment, the water mixing ratio of soft water to raw water may be determined based on the target hardness of outflow water by determining the water mixing ratio of soft water to raw water based on the target hardness of outflow water and a preset hardness of inflow water.

The method further includes the following.

The preset hardness of inflow water is reconfigured based on the inlet water hardness adjustment request in response to a hardness adjustment request for the outflow water.

It should be noted that, the water mixing ratio of soft water to raw water can be calculated based on the pre-configured hardness of inflow water and target hardness of outflow water by using a law that the total hardness of the mixed water is equal to the total hardness of a water outlet, that is, through the formula $L2 \times H1 = (L1+L2) \times H2$, where $L1$ is the amount of water treated with softening resin, $L2$ is the amount of mixed raw water, $H1$ is the hardness of the inflow water, and $H2$ is the hardness of the outflow water. It can be understood that tap water in different regions has different hardness. As such, the embodiment of the present disclosure provides a function of adjusting the hardness of the inflow water. The user can determine the hardness of the tap water by using testing tools to configure a default hardness of inflow water in the device logic calculation, and the water mixing ratio can be calculated more accurately.

In the method for adjusting the hardness of the outflow water from the water softening device according to the embodiment of the present disclosure, by determining the water mixing ratio of soft water to raw water based on the hardness of the outflow water and the hardness of inflow water, and providing a function of adjusting the hardness of inflow water, the user may adjust the hardness of inflow water based on the actual situation and can calculate a more accurate water mixing ratio, which further improves the accuracy of adjusting the hardness of the outflow water from the water softener.

In an embodiment, the water mixing unit adopts a continuously-adjustable regulating valve.

It can be understood that although the water mixing unit with stepped adjustment can simplify the control logic of the adjustment device, a more accurate required hardness of outflow water cannot be obtained. As such, the water mixing unit in the embodiment of the present disclosure uses the continuously-adjustable regulating valve to adjust the water mixing ratio and the hardness of the outflow water can be intensively controlled.

In the method for adjusting the hardness of the outflow water from the water softening device according to the embodiment of the present disclosure, the mixing ratio of soft water to raw water is controlled by the continuously-adjustable regulating valve, the precision of adjusting the hardness of the mixed water may be improved, which further improves the accuracy of adjusting the hardness of the outflow water from the water softener and improve user experience.

Based on the above solution, in order to better understand the method for adjusting the hardness of the outflow water from the water softening device according to the embodiment of the present disclosure, specific examples are listed below for detailed description.

It is assumed that:

H1 is the hardness of inflow water;

H2 is the hardness of outflow water;

L1 is the amount of water treated with softening resin; and

L2 is the amount of mixed raw water (raw water refers to water that is untreated with the softening resin);

It can be understood that, one stream of water coming out of the resin tank and treated with softening resin is equivalent to softened water with hardness close to 0; another stream of water is raw water, and has hardness equal to the hardness of the inflow water (pre-configured or user-adjusted); and L1 is mixed L2 and the outflow water has a hardness.

Since the total hardness of the mixed water is equal to the total hardness of outflow water, the following can be derived:

$$L2 \times H1 + L1 \times 0 = (L1 + L2) \times H2,$$

then:

$$L2 = [(L1 + L2) \times H2]/H1,$$

$$L2 = (L1 \times H2)/(H1 - H2),$$

and $$L1/L2 = H1/H2 - 1.$$

The water mixing ratio of L1 to L2 can be obtained based on the pre-configured H1 and H2 input by the user, and then the opening degree of the water mixing unit may be adjusted.

Hardware used in the embodiment of the present disclosure may include:

1. a continuously-adjustable regulating valve for controlling and adjusting the opening degree of the valve through a logic algorithm, accurately controlling the amount of water passing through the valve, and adjusting the hardness of the outflow water by adjusting the ratio of inflow water to soft water; and
2. a hardness sensor, which is a device that can automatically detect the content of calcium and magnesium ions in water and read the hardness of water.

Logic Control Mode 1:

hardness of the inflow water has been obtained when the water softener is mounted after sales. Generally, the hardness of the inflow water will not be changed and the value can be considered constant.

Several numerical intervals can be given to the hardness of the outflow water. After studying the experimental data, the users are advised to use several hardness intervals, such as: the first soft water interval of 0-17.1 ppm; the second soft water interval of 60-90 ppm; and the third soft water interval of 90-120 ppm, etc. The interval can be adjusted based on different requirements.

A size of the opening degree of the logic-controlled continuously-adjustable regulating valve is calculated as follows:

1. when the required hardness of outflow water is less than 17.1 ppm, L2-0, the continuously-adjustable regulating valve is completely closed; and
2. the center value is used for different hardness intervals. For example, for the interval of 60-90 ppm, the intermediate value of hardness of outflow water H2 is 75 ppm. H1 has been assigned a fixed value when the water softener is mounted. The electronic control automatically adjusts the opening degree of the continuously-adjustable regulating valve based on an L1/L2 value, which is calculated based on the logic algorithm L1/L2=H1/75−1. The hardness of the outflow water from the water softener in different installation areas may be automatically adjusted.

Logic Control Mode 2:

Hardness of the inflow water has been obtained when the water softener is mounted after sales. Generally, the hardness of the inflow water will not be changed and the value can be considered constant; and the hardness of the outflow water is input by the user as needed. The hardness sensor is configured to obtain the actual hardness of the outflow water in real time. There is no need to assign hardness interval value.

A size of the opening degree of the logic-controlled continuously-adjustable regulating valve is calculated as follows:

1. when the required hardness of outflow water is less than 17.1 ppm, L2-0, the continuously-adjustable regulating valve is completely closed; and
2. H2 is determined based on the input value by the user, such as 68 ppm; H1 has been assigned a fixed value when the water softener is mounted. The electronic control automatically adjusts the opening degree of the continuously-adjustable regulating valve based on an L1/L2 value calculated based on the logic algorithm L1/L2=H1/68−1, and perform error compensation on the opening degree of the continuously-adjustable regulating valve based on the collected actual hardness of the outflow water. The hardness of the outflow water from the water softener in different installation areas may be automatically adjusted.

It can be understood that the steps for adjusting hardness of outflow water from the water softener are as follows.

I. no water mixing unit is mounted, the hardness of the outflow water cannot be adjusted.

II. A water mixing unit is mounted. 1. The water softener is disassembled to find the water mixing unit. 2. The water mixing unit is opened to an opening degree; 3. the hardness of the outflow water is tested with professional equipment and technical operating specifications. 4. The test result is greater (less than) required hardness of the outflow water. 5. The opening degree of the water mixing unit is decreased (increased). 6. The hardness of the outflow water is tested with professional equipment and technical operating specifications. 7. If the test result is not consistent with a required hardness of the outflow water, the cycle operation will be performed. 8. The test result is consistent with the required hardness of the outflow water. 9. The disassembled parts are assembled back into the water softener. Since the hardness of outflow water value is single, if a user needs to adjust other hardness of outflow water next time, the user needs to repeat the above steps, which is a very complicated and cumbersome process.

The steps for adjusting the hardness of the outflow water from the water softener according to the embodiment of the present disclosure are as follows:

I. 1. The hardness intervals are given when the machine leaves the factory. 2. The user selects the required hardness interval (selected on the screen or on the App). 3. A size of the opening degree of the water mixing valve is calculated based on the formula using a logic algorithm. 4. The water mixing valve is controlled to a required opening degree. 5. The user obtains the required hardness of the outflow water.

II. 1. The hardness of outflow water is obtained using the hardness sensor in real time. 2. The user sets the required hardness of outflow water (selected on the screen or on the App). 3. A size of the opening degree of the water mixing valve is calculated based on the formula using a logic algorithm. 4. The water mixing valve is controlled to a required opening degree. 5. The user obtains the required hardness of the outflow water. As such, the user can obtain any hardness value required.

Compared with the related art, the embodiment of the present disclosure have the following effects: through software logic algorithms and hardware automated continuously-adjustable adjustment functions, the hardness of the outflow water can be automatically adjusted; after the user selects the required hardness of the outflow water, the operation-free fully automatic effect is provided, which meets requirements of the user for the outflow water having different hardness values.

Figure 2:
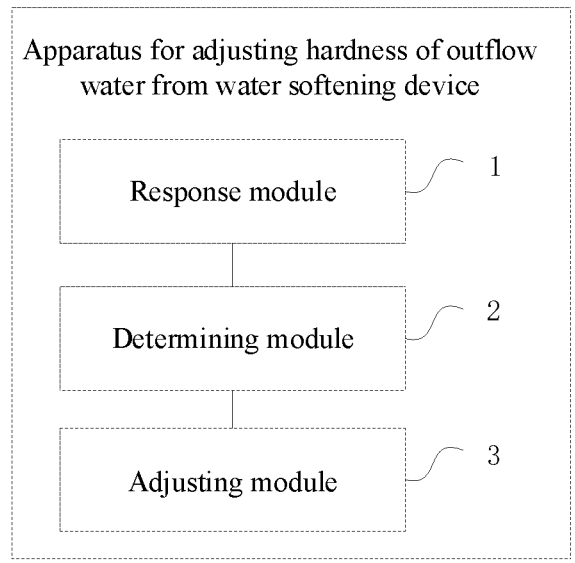
FIG. 2 is a schematic structural diagram of an apparatus for adjusting hardness of outflow water from a water softening device according to an embodiment of the present disclosure.

Referring to FIG. 2, an embodiment of the present disclosure provides an apparatus for adjusting hardness of outflow water from a water softening device, including:
  a response device 1 for determining, in response to a hardness adjustment request for the outflow water, target hardness of outflow water corresponding to the hardness adjustment request for the outflow water;
  a determining device 2 for determining a water mixing ratio of soft water to raw water based on the target hardness of outflow water; and
  an adjusting device 3 for adjusting an opening degree of a water mixing unit of the water softening device based on the water mixing ratio,
  where the water mixing unit is configured to control the mixing of raw water and soft water in the water softening device.

In an embodiment of the present disclosure, the target hardness of outflow water corresponding to the hardness adjustment request for the outflow water is determined based on a target hardness interval in the hardness adjustment request for the outflow water.

In an embodiment of the present disclosure, the target hardness of outflow water is determined based on the target hardness interval in the hardness adjustment request for the outflow water by:
  determining the target hardness of outflow water based on a target value in the target hardness interval in the hardness adjustment request for the outflow water,
  where the target value includes any one of the following:
  an intermediate value of the target hardness interval;
  a random value of the target hardness interval;
  a maximum value of the target hardness interval; and
  a minimum value of the target hardness interval.

In an embodiment of the present disclosure, the target hardness of outflow water corresponding to the hardness adjustment request for the outflow water is determined based on a target hardness configuration value in the hardness adjustment request for the outflow water.

In an embodiment, the apparatus for adjusting hardness of outflow water from a water softening device may further include a compensation device for:
  obtaining a current hardness of outflow water from the water softening device; and
  determining an opening degree compensation value based on a difference between the current hardness of outflow water and the target hardness of outflow water, and adjusting the opening degree of the water mixing unit based on the opening degree compensation value.

In an embodiment, the determining device 2 may be configured to:
  determine, in accordance with a determination that the target hardness of outflow water is within a preset adjustable threshold range, the water mixing ratio of soft water to raw water based on the target hardness of outflow water; or,
  indicate that, in accordance with a determination that the target hardness of outflow water is not within a preset adjustable threshold range, the hardness adjustment request for the outflow water is abnormal.

In an embodiment, the determining device 2 may be configured to:
  determine the water mixing ratio of soft water to raw water based on the target hardness of outflow water and a preset hardness of inflow water;
  where the apparatus for adjusting hardness of outflow water from a water softening device may further include a configuring device configured to:
  reconfigure, in response to a hardness adjustment request for the outflow water, the preset hardness of inflow water based on the inlet water hardness adjustment request.

In an embodiment, the water mixing unit adopts a continuously-adjustable regulating valve.

Figure 3:
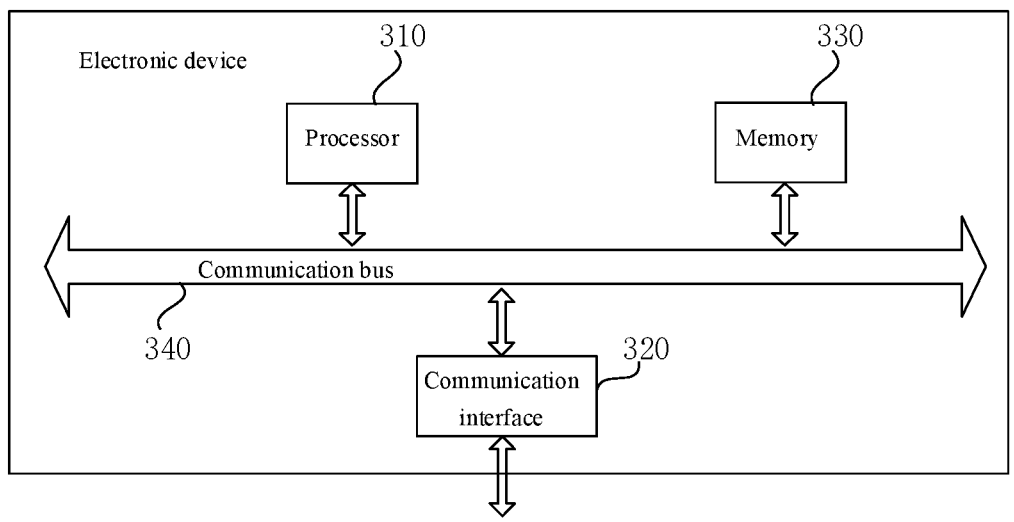
FIG. 3 is a schematic structural diagram of an electronic device according to an embodiment of the present disclosure.

FIG. 3 is a schematic diagram of the physical structure of an electronic device. As shown in FIG. 3, the electronic device may include a processor 310, a communication interface 320, a memory 330, and a communication bus 340. The processor 310, the communication interface 320, and the memory 330 communicate with each other through the communication bus 340. The processor 310 may call the logic instructions in the memory 330 to perform the following method, and the method includes the following.
  S1: target hardness of outflow water corresponding to the hardness adjustment request for the outflow water is determined in response to a hardness adjustment request for the outflow water.
  S2: a water mixing ratio of soft water to raw water is determined based on the target hardness of outflow water.
  S3: an opening degree of a water mixing unit of a water softening device is adjusted based on the water mixing ratio, where the water mixing unit is configured to control the mixing of raw water and soft water in the water softening device.

In addition, the logic instructions in the memory 330 described above may be implemented in the form of a software functional unit and may be stored in a computer readable storage medium as being sold or used as a separate product. Based on such understanding, the solution of the present disclosure or a part of the solution, which is essential or contributes to the prior art, may be embodied in the form of a software product, which is stored in a storage medium, including several instructions to cause a computer device (which may be a personal computer, server, or network device, etc.) to perform all or part of the steps of the methods described in various embodiments of the present disclosure. The storage medium described above includes various media that can store program codes such as flash disk, mobile hard disk, read-only memory (ROM), random access memory (RAM), magnetic disk, or optical disk.

An embodiment of the present disclosure provides a computer program product, including: a computer program stored on a non-transient computer readable storage medium, the computer program includes program instructions, when executed by a computer, causing the computer to perform the method described above. The method includes the following.

S1: target hardness of outflow water corresponding to the hardness adjustment request for the outflow water is determined in response to a hardness adjustment request for the outflow water.

S2: a water mixing ratio of soft water to raw water is determined based on the target hardness of outflow water.

S3: an opening degree of a water mixing unit of a water softening device is adjusted based on the water mixing ratio, where the water mixing unit is configured to control the mixing of raw water and soft water in the water softening device.

An embodiment of the present disclosure provides a non-transitory computer-readable storage medium having stored thereon computer programs, that, when executed by a processor, causes the processor to perform the method mentioned in above embodiments, and the method includes the following.

S1: target hardness of outflow water corresponding to the hardness adjustment request for the outflow water is determined in response to a hardness adjustment request for the outflow water.

S2: a water mixing ratio of soft water to raw water is determined based on the target hardness of outflow water.

S3: an opening degree of a water mixing unit of a water softening device is adjusted based on the water mixing ratio, where the water mixing unit is configured to control the mixing of raw water and soft water in the water softening device.

The device embodiments described above are merely illustrative, where the units described as separate components may or may not be physically separate, and the components displayed as units may or may not be physical units, that is, may be located at the same place, or it can be distributed to network units. Some or all of the modules may be selected according to actual needs to achieve the purpose of the solution of the present embodiment.

Through the description of the embodiments above, the various embodiments can be implemented by means of software and a necessary general hardware platform, and of course, by hardware. Based on such understanding, the embodiments of the present application, which is essential or contributes to the related art, may be embodied in the form of a software product, which is stored in a storage medium such as ROM/RAM, magnetic disks, optical disks, etc., including several instructions to cause a computer device (which may be a personal computer, server, or network device, etc.) to perform various embodiments or a part of the methods described in various embodiments.

What is claimed is:

1. A method for adjusting hardness of outflow water from a water softening device, comprising:
   determining, in response to a hardness adjustment request for the outflow water, target hardness of outflow water corresponding to the hardness adjustment request for the outflow water;
   determining a water mixing ratio of soft water to raw water based on the target hardness of outflow water;
   adjusting an opening degree of a water mixing unit of a water softening device based on the water mixing ratio;
   obtaining current hardness of outflow water from the water softening device; and
   determining an opening degree compensation value based on a difference between the current hardness of outflow water and the target hardness of outflow water, and further adjusting the opening degree of the water mixing unit based on the opening degree compensation value;
   wherein the water mixing unit is configured to control the mixing of raw water and soft water in the water softening device.

2. The method of claim 1, wherein determining target hardness of outflow water corresponding to the hardness adjustment request for the outflow water comprises:
   determining the target hardness of outflow water based on a target hardness interval in the hardness adjustment request for the outflow water.

3. The method of claim 2, wherein the determining the target hardness of outflow water based on target hardness interval in the hardness adjustment request for the outflow water comprises:
   determining the target hardness of outflow water based on a target value in the target hardness interval in the hardness adjustment request for the outflow water,
   wherein the target value comprises any one of the following:
   an intermediate value of the target hardness interval;
   a random value of the target hardness interval;
   a maximum value of the target hardness interval; and
   a minimum value of the target hardness interval.

4. The method of claim 1, wherein determining target hardness of outflow water corresponding to the hardness adjustment request for the outflow water comprises:
   determining the target hardness of outflow water based on a target hardness configuration value in the hardness adjustment request for the outflow water.

5. The method of claim 1, wherein determining the water mixing ratio of soft water to raw water based on the target hardness of outflow water comprises:
   determining, in accordance with a determination that the target hardness of outflow water is within a preset adjustable threshold range, the water mixing ratio of soft water to raw water based on the target hardness of outflow water; or,
   indicating that, in accordance with a determination that the target hardness of outflow water is not within a preset adjustable threshold range, the hardness adjustment request for the outflow water is abnormal.

6. The method of claim 1, wherein determining the water mixing ratio of soft water to raw water based on the target hardness of outflow water comprises:
   determining the water mixing ratio of soft water to raw water based on the target hardness of outflow water and a preset hardness of inflow water,
   wherein the method for adjusting the hardness of the outflow water from the water softening device further comprises:
   reconfiguring, in response to a hardness adjustment request for the outflow water, the preset hardness of inflow water based on the hardness adjustment request for the outflow water.

7. The method of claim 1, wherein the water mixing unit adopts a continuously-adjustable regulating valve.

8. An electronic device, comprising a memory, a processor, and computer programs stored on the memory and executable on the processor, wherein the computer programs, when executed by a processor, cause the electronic device to perform a method for adjusting hardness of outflow water from a water softening device of claim 1.

9. A non-transitory computer-readable storage medium having stored thereon computer programs, wherein the computer programs, when executed by a processor, cause the processor to perform a method for adjusting hardness of outflow water from a water softening device of claim 1.

10. A computer program product, having computer programs, wherein the computer programs, when executed by a processor, cause the processor to perform a method for adjusting hardness of outflow water from a water softening device, which includes:
   determine, in response to a hardness adjustment request for the outflow water, target hardness of outflow water corresponding to the hardness adjustment request for the outflow water;
   determine a water mixing ratio of soft water to raw water based on the target hardness of outflow water;
   adjust an opening degree of a water mixing unit of a water softening device based on the water mixing ratio;
   obtain current hardness of outflow water from the water softening device; and
   determine an opening degree compensation value based on a difference between the current hardness of outflow water and the target hardness of outflow water, and further adjust the opening degree of the water mixing unit based on the opening degree compensation value;
   wherein the water mixing unit is configured to control the mixing of raw water and soft water in the water softening device.

11. The computer program product of claim 10, wherein determining target hardness of outflow water corresponding to the hardness adjustment request for the outflow water comprises:
   determining the target hardness of outflow water based on a target hardness interval in the hardness adjustment request for the outflow water.

12. The computer program product of claim 11, wherein the determining the target hardness of outflow water based on target hardness interval in the hardness adjustment request for the outflow water comprises:
   determining the target hardness of outflow water based on a target value in the target hardness interval in the hardness adjustment request for the outflow water,
   wherein the target value comprises any one of the following:
   an intermediate value of the target hardness interval;
   a random value of the target hardness interval;
   a maximum value of the target hardness interval; and
   a minimum value of the target hardness interval.

13. The computer program product of claim 10, wherein determining target hardness of outflow water corresponding to the hardness adjustment request for the outflow water comprises:
   determining the target hardness of outflow water based on a target hardness configuration value in the hardness adjustment request for the outflow water.

14. The computer program product of claim 10, wherein determining the water mixing ratio of soft water to raw water based on the target hardness of outflow water comprises:
   determining, in accordance with a determination that the target hardness of outflow water is within a preset adjustable threshold range, the water mixing ratio of soft water to raw water based on the target hardness of outflow water; or,
   indicating that, in accordance with a determination that the target hardness of outflow water is not within a preset adjustable threshold range, the hardness adjustment request for the outflow water is abnormal.

15. The computer program product of claim 10, wherein determining the water mixing ratio of soft water to raw water based on the target hardness of outflow water comprises:
   determining the water mixing ratio of soft water to raw water based on the target hardness of outflow water and a preset hardness of inflow water,
   wherein the method for adjusting the hardness of the outflow water from the water softening device further comprises:
   reconfiguring, in response to a hardness adjustment request for the outflow water, the preset hardness of inflow water based on the hardness adjustment request for the outflow water.

16. The computer program product of claim 10, wherein the water mixing unit adopts a continuously-adjustable regulating valve.

* * * * *